US007423712B2

(12) United States Patent
Jeoung et al.

(10) Patent No.: US 7,423,712 B2
(45) Date of Patent: Sep. 9, 2008

(54) TRANSFLECTIVE TYPE LIQUID CRYSTAL DISPLAY FABRICATION METHOD WITH FIRST HALF-TONE MASK FOR SELECTIVELY REMOVING INSULATING INTERLAYER/TRANSPARENT CONDUCTIVE LAYER AND SECOND HALF-TONE MASK FOR SELECTIVELY REMOVING INSULATING LAYER FOR UNEVEN SURFACE

(75) Inventors: Hun Jeoung, Kyongsangbuk-do (KR); Soon Kwang Hong, Taegu-Kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 535 days.

(21) Appl. No.: 11/022,649

(22) Filed: Dec. 28, 2004

(65) Prior Publication Data

US 2005/0140877 A1 Jun. 30, 2005

(30) Foreign Application Priority Data

Dec. 30, 2003 (KR) ................ 10-2003-0101012

(51) Int. Cl.
*G02F 1/1335* (2006.01)
(52) U.S. Cl. .................... 349/114; 349/47; 349/187
(58) Field of Classification Search ............. 349/114, 349/187, 47
See application file for complete search history.

(56) References Cited

U.S. PATENT DOCUMENTS 6,744,486 B2 * 6/2004 Kim et al. ................ 349/187

| | | | |
|---|---|---|---|
| 6,774,965 B2 * | 8/2004 | Nakashima et al. | 349/114 |
| 7,193,679 B2 * | 3/2007 | Sakamoto et al. | 349/187 |
| 2002/0149722 A1 | 10/2002 | Anno et al. | |
| 2002/0158995 A1 | 10/2002 | Hwang et al. | |
| 2003/0025859 A1 | 2/2003 | Moon et al. | |
| 2003/0160921 A1 | 8/2003 | Nakashima et al. | |
| 2003/0164911 A1 | 9/2003 | Eguchi et al. | |
| 2004/0189896 A1 | 9/2004 | Cho et al. | |
| 2004/0227877 A1 | 11/2004 | Jeong et al. | |

FOREIGN PATENT DOCUMENTS

| FR | 2 864 704 A1 | 11/2004 |
|---|---|---|
| JP | 2000-305099 | 11/2000 |
| JP | 2000-347219 | 12/2000 |
| JP | 2003-149638 | 5/2003 |
| JP | 2003-195275 | 7/2003 |

* cited by examiner

*Primary Examiner*—David C. Nelms
*Assistant Examiner*—John Heyman
(74) *Attorney, Agent, or Firm*—McKenna Long & Aldridge LLP

(57) ABSTRACT

Disclosed is a trans-reflective type LCD device and a method for fabricating the same wherein the method reduces the required number of masks by using a half-tone mask and a diffraction exposure process. Further, by using a half-tone mask and diffraction exposure process, a desired uneven surface may be formed on the reflective part of the pixel region without resorting to thermal processes that may otherwise degrade an insulating layer under the reflective electrode. Accordingly, an organic insulating material may be used between the transmissive electrode and the reflective electrode.

13 Claims, 8 Drawing Sheets

TRANSFLECTIVE TYPE LIQUID CRYSTAL DISPLAY FABRICATION METHOD WITH FIRST HALF-TONE MASK FOR SELECTIVELY REMOVING INSULATING INTERLAYER/TRANSPARENT CONDUCTIVE LAYER AND SECOND HALF-TONE MASK FOR SELECTIVELY REMOVING INSULATING LAYER FOR UNEVEN SURFACE

This application claims the benefit of Korean Patent Application No. 2003-101012, filed on Dec. 30, 2003, which is hereby incorporated by reference in its entirety for all purposes as if fully set forth herein.

BACKGROUND OF THE INVENTION

1. Field of the Invention

The present invention relates to a liquid crystal display (LCD) device, and more particularly, to a trans-reflective type LCD device and a method for fabricating the same, using a half-tone mask and a diffraction exposure.

2. Discussion of the Related Art

In general, LCD devices are classified into a transmitting type LCD device using a backlight as a light source, and a reflective type LCD device using ambient and artificial light as a light source without using a backlight. Since the transmitting type LCD device uses the backlight as the light source, it can display images in dark surroundings. However, the transmitting type LCD device has the disadvantageous characteristics in that it cannot be used in the bright surroundings, and it has high power consumption. The reflective type LCD device does not use a backlight and thus consumes less power. However, the reflective type LCD device cannot be used in the dark surroundings.

A related art solution is a trans-reflective type LCD device. The trans-reflective type LCD device includes unit pixel regions, each unit pixel having a transmitting part and a reflective part, whereby it can use both ambient light and the light generated from a backlight. Thus, with a trans-reflective type LCD device, it is possible to decrease power consumption and use the device in various ambient light conditions.

The related art LCD device has an additional storage capacitor to support the charge maintenance capacity of liquid crystal. The structure forming a capacitor between a gate line and a pixel electrode is referred to as a storage on gate structure, and the structure forming a capacitor between a common electrode line and a pixel electrode is referred to as a storage on common structure. The storage capacitor helps maintain a voltage applied to a pixel electrode by a corresponding thin film transistor. Accordingly, the storage capacitor mitigates current leakage between subsequent pixel voltage applications and thus helps prevent deterioration of picture quality induced by flicker.

Figure 1:
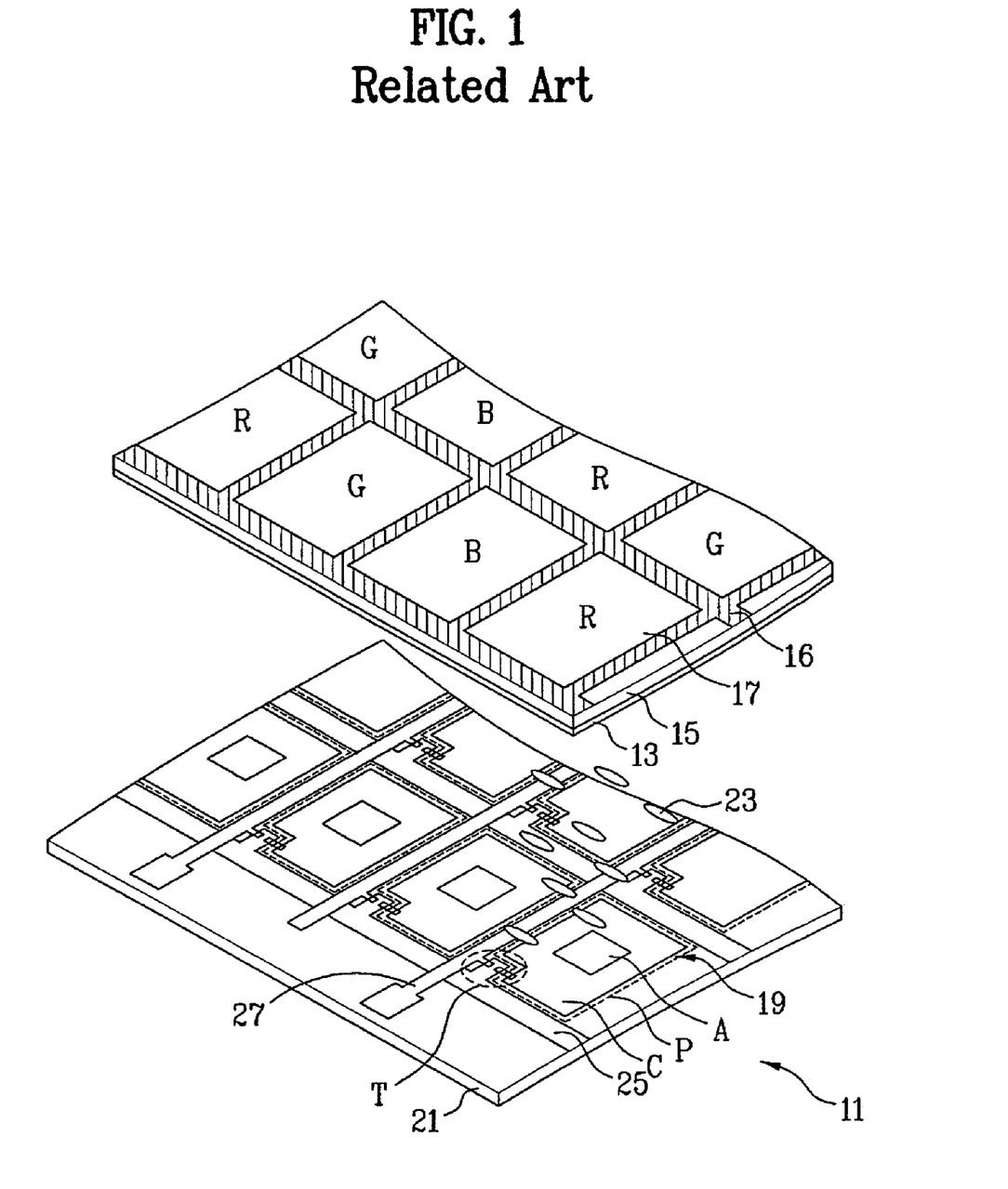
FIG. 1 is an exploded perspective view of a portion of a general trans-reflective type LCD device according to the related art.
Figure 2:
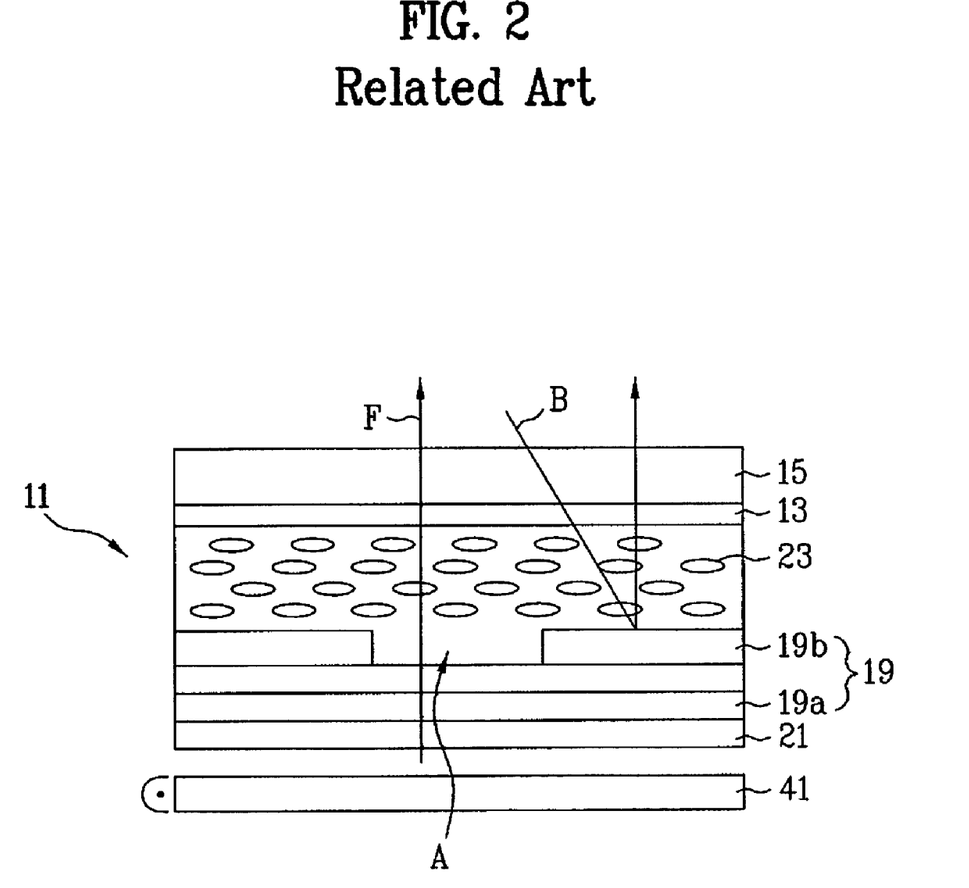
FIG. 2 is a cross sectional view of a trans-reflective type LCD device according to the related art.
Figure 3:
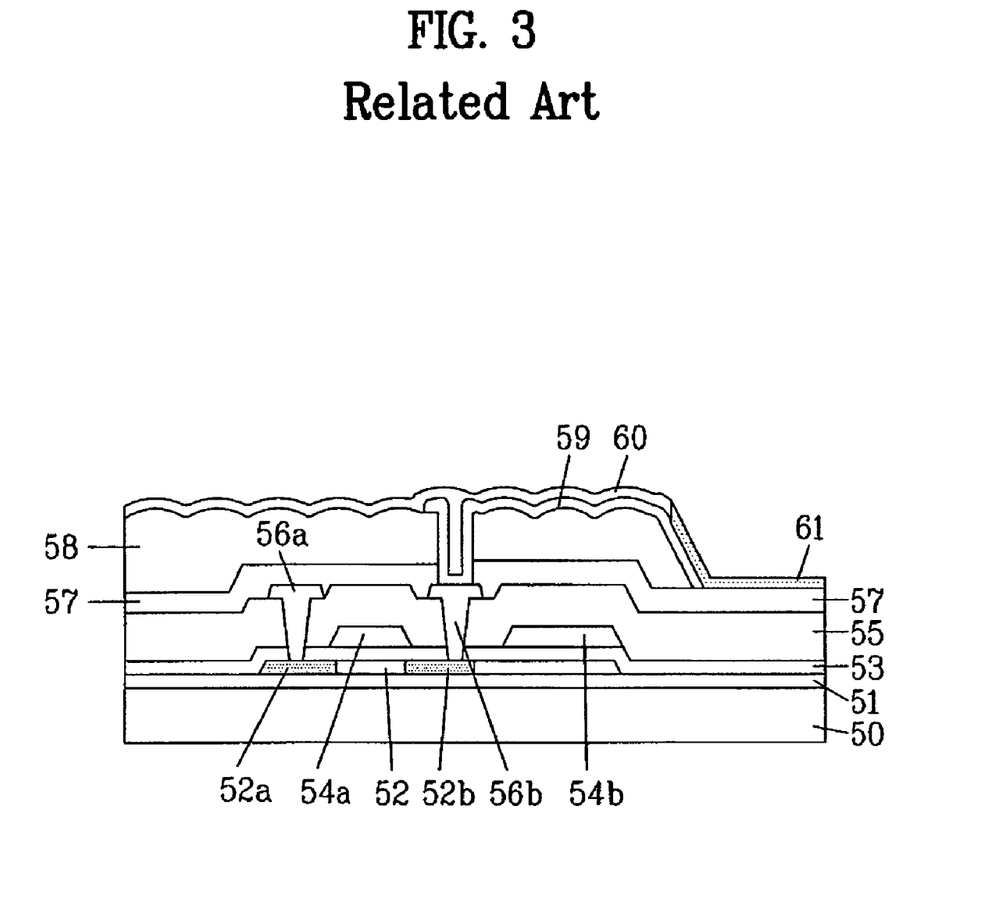
FIG. 3 is a cross sectional view of a trans-reflective type LCD device according to the related art.

FIGS. 1-3 illustrate a trans-reflective LCD according to the related art.

FIG. 1 is an exploded perspective view of some parts of a general trans-reflective type LCD device. As illustrated in FIG. 1, the general trans-reflective type LCD device 11 includes an upper substrate 15, a lower substrate 21, and a liquid crystal layer 23. The upper substrate 15 includes a color filter 17 including a black matrix 16, and a transparent common electrode 13 formed on the color filter 17. The lower substrate 21 includes a pixel electrode 19 having a transmitting part A and a reflective part C in a pixel region, a switching device T, and an array line. The liquid crystal layer 23 is formed between the upper substrate 15 and the lower substrate 21.

The lower substrate 21 is referred to as a TFT array substrate, on which a plurality of gate lines 25 are formed perpendicularly to a plurality of data lines 27, defining a plurality of pixel regions. A plurality of thin film transistors T are formed at respective crossing portions of the plurality of gate and data lines 25 and 27, wherein the plurality of thin film transistors T are formed in a matrix-type configuration.

An operation of the general trans-reflective type LCD device will be described with reference to FIG. 2.

FIG. 2 is a cross sectional view of the general trans-reflective type LCD device. As illustrated in FIG. 2, the trans-reflective type LCD device 11 includes the upper substrate 15, the lower substrate 21, the liquid crystal layer 23, and a backlight 41. The upper substrate 15 has the common electrode 13, and the lower substrate 21 has the pixel electrode 19 including a transmitting electrode 19a formed in the pixel region P that includes transmitting part A, and a reflective electrode 19b formed in the pixel region P that excludes transmitting part A. Also, the liquid crystal layer 23 is formed between the upper substrate 15 and the lower substrate 21, and the backlight 41 is provided below the lower substrate 21.

If the trans-reflective type LCD device 11 is operated in a reflective mode, the trans-reflective type LCD device 11 uses ambient light.

An operation of the trans-reflective type LCD device in transmitting mode and reflective mode will be described as follows.

In reflective mode, the trans-reflective type LCD device uses ambient light. That is, light B, which is incident on the upper substrate 15 of the trans-reflective type LCD device 11, is reflected off on the reflective electrode 19b. The reflected light passes through the liquid crystal layer 23 aligned by an electric field between the reflective electrode and the common electrode 13, and the amount of light B passing through the liquid crystal layer 23 is controlled according to the alignment of the liquid crystal molecules within liquid crystal layer 23, thereby displaying the image.

In the transmitting mode, the trans-reflective type LCD device uses the light F emitted from the backlight 41 below the lower substrate 21. That is, the light F emitted from the backlight 41 is incident on the liquid crystal layer 23 through the transmitting electrode 19 and the transmitting part A. The amount of light transmitted from the backlight 41 through the LCD structure is controlled according to the alignment of the liquid crystal molecules within liquid crystal layer 23, thereby displaying an image. The alignment of the liquid crystal molecules is controlled by an electric field between the transmitting electrode 19a and the common electrode 13. The electric field corresponds to the voltage applied to the pixel electrode by the thin film transistor.

Generally, the LCD device includes a thin film transistor array substrate referred to as a lower substrate, a color filter substrate referred to as an upper substrate, and a liquid crystal layer formed between the lower and upper substrates.

A method for fabricating the trans-reflective type LCD device according to the related art is described as follows.

FIG. 3 is a cross sectional view of the trans-reflective type LCD device according to the related art. The trans-reflective type LCD device of FIG. 3 is fabricated with nine masks according to the following procedure.

First, a buffer insulating layer 51 is formed on a substrate 50. After that, an amorphous silicon layer is deposited on the substrate, and is crystallized to a polysilicon layer by a thermal curing process and a laser curing process.

Then, the polysilicon layer is patterned by photolithography using a first mask, thereby forming a semiconductor pattern 52 on portions corresponding to a thin film transistor and a storage capacitor. Subsequently, a gate insulating layer 53 and a conductive metal layer are sequentially deposited on an entire surface of the substrate 50 including the semiconductor pattern 52. The conductive metal layer is then selectively removed by photolithography using a second mask, thereby forming a gate line (not shown) and a gate electrode 54a projected from the gate line. A common line (not shown) is formed in parallel with the gate line, and is overlapped with the semiconductor pattern 52. A portion of the common line overlapped with the semiconductor pattern 52 forms a storage electrode 54b.

Next, n-type or p-type impurity ions are implanted into the semiconductor pattern 52 by using the gate electrode 54a as a mask, thereby forming source and drain regions 52a and 52b, respectively. A first insulating interlayer 55 is then formed at a thickness of 7000 Å on the entire surface of the substrate 50 including the gate electrode 54a. The first insulating interlayer 55 and the gate insulating layer 53 are patterned by photolithography using a third mask, thereby forming first and second contact holes in the source/drain regions 52a/52b.

A conductive metal layer is deposited on the entire surface of the substrate including the first and second contact holes, and is patterned by photolithography using a fourth mask to form the source electrode 56a that is electrically connected to source region 52a, and drain electrode 56b that is electrically connected to drain region 52b.

Next, second and third insulating interlayers 57 and 58 are deposited in sequence, wherein the second and third insulating interlayers 57 and 58 are formed of silicon nitride and BCB (benzocyclobutene). The third insulating interlayer 58 is formed as an uneven surface by using a fifth mask. Subsequently, the second and third insulating interlayers 57 and 58 are etched by photolithography using a sixth mask, thereby forming a first hole in the transmitting part, and a third contact hole on the drain electrode 56b.

A reflective electrode 59 is formed by depositing a reflective metal layer on the entire surface of the substrate to be in contact with the drain electrode 56b through the third contact hole, and patterned by photolithography using a seventh mask. Then, a fourth insulating interlayer 60 of silicon nitride is deposited on the entire surface of the substrate 50. The fourth insulating interlayer is etched by photolithography using an eighth mask, thereby exposing a predetermined portion of the reflective electrode 59 and the transmitting part A.

Subsequently, a transparent conductive layer is deposited on the entire surface of the substrate, to be in contact with the reflective electrode 59, and then is patterned by photolithography using a ninth mask, thereby forming a transmitting electrode 61 in a pixel region. The storage capacitor is formed by the semiconductor pattern 52, the gate insulating layer 53, and the storage electrode 54b.

As explained above, the trans-reflective type LCD device according to the related art is fabricated with the nine masks. The fabrication steps are complicated due to the alignment process of the mask and the exposure and development process, thereby lowering the yield.

Also, it is generally required to perform the additional thermal process for forming the uneven surface of the reflective part, which may deteriorate materials that would otherwise be desirable for the insulating material under the reflective electrode.

In addition, the transmissive electrode of the related art is generally formed on top of the reflective electrode, which generally decreases the reflective area of the reflective electrode.

SUMMARY OF THE INVENTION

Accordingly, the present invention is directed to a trans-reflective type LCD device and a method for fabricating the same that obviate one or more problems due to limitations and disadvantages of the related art.

An advantage of the present invention is to provide a trans-reflective type LCD device, and a method for fabricating the same, that decreases the number of masks by using a half-tone mask and a diffraction exposure process.

Another advantage of the present invention is to provide a method for fabricating a trans-reflective type LCD device that enables the use of a broader range of materials for insulators.

Another advantage of the present invention is to provide a trans-reflective type LCD device with improved reflectivity.

Another advantage of the present invention is to provide a trans-reflective type LCD device that is less susceptible to corrosion at the interface of the reflective and transmissive electrodes.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these advantages and in accordance with the purpose of the invention, as embodied and described herein, a trans-reflective type LCD device including unit pixel regions, each pixel region having a reflective part and a transmissive part, comprises a transmissive electrode disposed on a first insulating layer in the pixel region, the transmissive electrode being electrically connected to a drain region; a second insulating layer disposed substantially on a portion of the transmissive electrode corresponding to the reflective part, the second insulating layer having an organic material and an uneven surface; and a reflective electrode disposed substantially on the second insulating layer, the reflective electrode being electrically connected to the drain region and the transmissive electrode.

In another aspect of the present invention, a method method for fabricating a trans-reflective type LCD device including unit pixel regions, each pixel region having a reflective part and a transmissive part comprises forming an insulating interlayer and a transparent conductive layer on a substrate; forming a transmissive electrode in the pixel region by selectively removing the insulating interlayer and the transparent conductive layer with a first half-tone mask; depositing an insulating layer on the entire surface of the substrate including the transmissive electrode; selectively removing the insulating layer so that the remaining insulating interlayer corresponds to the transmissive part and so that the remaining insulating layer has an uneven surface, the selectively removing the insulating layer being done using a second half-tone mask; and forming a reflective electrode in the reflective part to be electrically connected with a drain region and the transmissive electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a trans-reflective type LCD device according to the present invention and a method for fabricating the same will be described with reference to the accompanying drawings.

Figure 4:
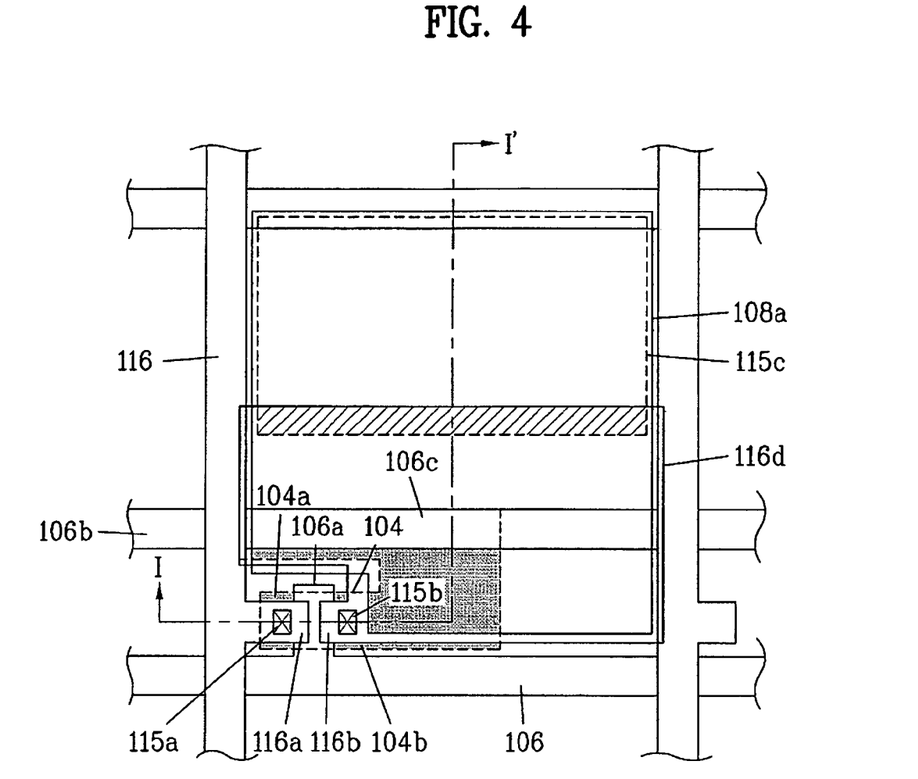
FIG. 4 is a plane view of a trans-reflective type LCD device according to the present invention.
Figure 5:
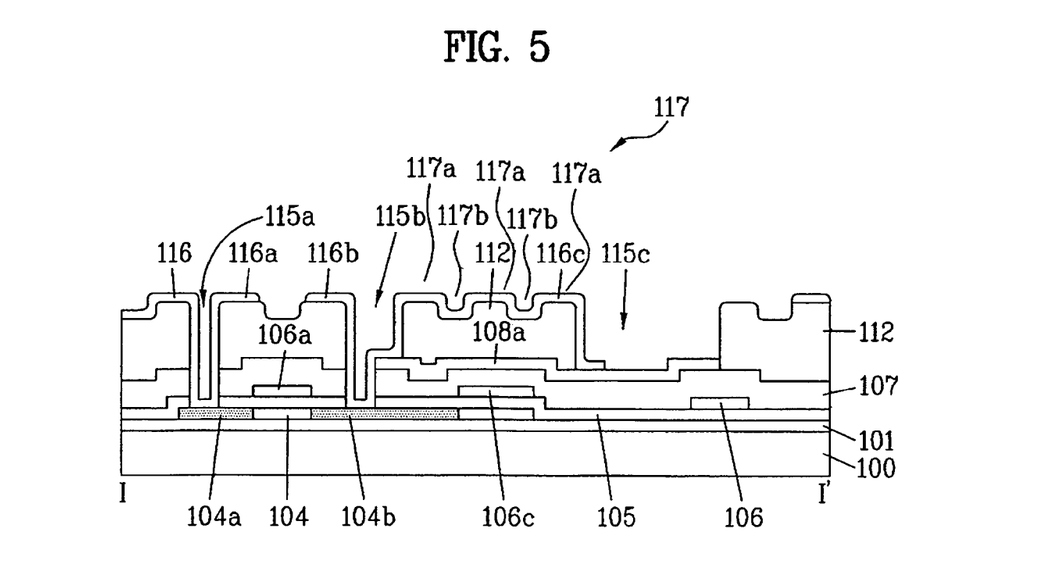
FIG. 5 is a cross sectional view of a trans-reflective type LCD device along I-I' of FIG. 4 according to the present invention.

FIG. 4 is a plan view of a trans-reflective type LCD device according to the preferred embodiment of the present invention. FIG. 5 is a cross sectional view of a trans-reflective type LCD device along I-I' of FIG. 4.

A trans-reflective type LCD device according to an exemplary embodiment of the present invention includes unit pixels, each unit pixel having a transmissive part and a reflective part. As illustrated in FIG. 5, a buffer insulating layer 101 is formed on a transparent substrate 100 and a semiconductor pattern 104 is disposed on the buffer insulating layer 101 corresponding to a thin film transistor and a storage capacitor.

The LCD structure further includes a gate insulating layer 105 disposed on the surface of the substrate 100 including the semiconductor pattern 104; a gate line 106 formed in one direction on the gate insulating layer 105; and a gate electrode 106a projected from the gate line 106 and overlapped with the semiconductor pattern 104. Also, a common line 106b is formed in parallel with the gate line 106 on the gate insulating layer 105. The common line 106b is partially overlapped with the semiconductor pattern 104, wherein a portion of the common line 106b overlapped with the semiconductor pattern 104 forms storage capacitor electrode 106c.

The semiconductor pattern 104 may have impurity ions implanted at both sides of the gate electrode 106a except for the portions below the gate electrode 106a and the storage electrode 106c, which form source/drain regions 104a/104b. A first insulating interlayer 107 is disposed on the surface of the substrate 100 including the gate line 106 and the common line 106a, and a transmitting electrode 108a is formed on a pixel region of the first insulating interlayer 107. The first insulating interlayer 107 may include a silicon oxide layer or a silicon nitride layer, although other insulating materials may be used.

An organic insulating layer 112 is formed on the first insulating interlayer 107 including the transmitting electrode 108a, and has an uneven surface 117 corresponding to the reflective part of the pixel region. The uneven surface 117 has a plurality of upper portions 117a and lower portions 117b. The organic insulating layer 112, the first insulating interlayer 107, and the gate insulating layer 105 have aligned holes 105a and 105b that expose the source region 104a and the drain region 104b for electrode contact. The transmitting hole 115c, which is an opening in the organic insulating layer that exposes the transmissive electrode 108a, corresponds to the transmitting part of the pixel region.

A data line 116 is formed substantially perpendicular to the gate line 106 and connected to a source electrode 116a. The source electrode 116a is connected with the source region 104a by the first contact hole 115a. Also, a drain electrode 116b and a reflective electrode 116c may be contiguous and connected with the drain region 104b by the second contact hole 115b. The reflective electrode 116c may be connected with the transmitting electrode 108a by the transmitting hole 115c. The reflective electrode 116c is disposed on a portion of the organic insulating layer 112 having an uneven surface 117, and may be projected from one side of the data line 116.

The data line 116, the source electrode 116a, the drain electrode 116b, and the reflective electrode 116c may be formed of reflective metal in a patterned layer. For example, the reflective metal may be formed in a single structure of a substantially homogeneous material having a low resistance value and relatively high optical transmittance, such as aluminum Al, aluminum alloy, or argentum Ag. Alternatively, the reflective metal may be formed in a deposition structure of a first metal material having a low resistance value and a second metal material having great transmittance. In a particular embodiment, the first metal material may include molybdenum Mo, and the second metal material may include aluminum Al, aluminum neodymium AlNd, or argentum Ag.

The thin film transistor TFT is formed at a crossing portion of the gate line 106 and the data line 116 and may include the following: the semiconductor pattern 104 formed on one portion of the substrate 100; the gate insulating layer 105 formed on the surface of the substrate 100 including the semiconductor pattern 104; the gate electrode 106a formed on one portion of the semiconductor pattern 104; the source and drain regions 104a and 104b formed in the semiconductor pattern 104 at both sides of the gate electrode 106a, and the source and drain electrodes 116a and 116b being respectively in contact with the source and drain regions 104a and 104b.

Also, the storage capacitor may be formed by the semiconductor pattern 104, the gate insulating layer 105, and the storage electrode 106c, and/or may be formed by the storage electrode 106e, the first insulating layer 107, and the transmitting electrode 108a.

A method for fabricating the aforementioned trans-reflective type LCD device according to an exemplary embodiment of the present invention will be described as follows.

FIG. 6A to FIG. 6J are cross sectional views of an exemplary fabrication process for the trans-reflective type LCD device along I-I' of FIG. 4.

Figure 6A:
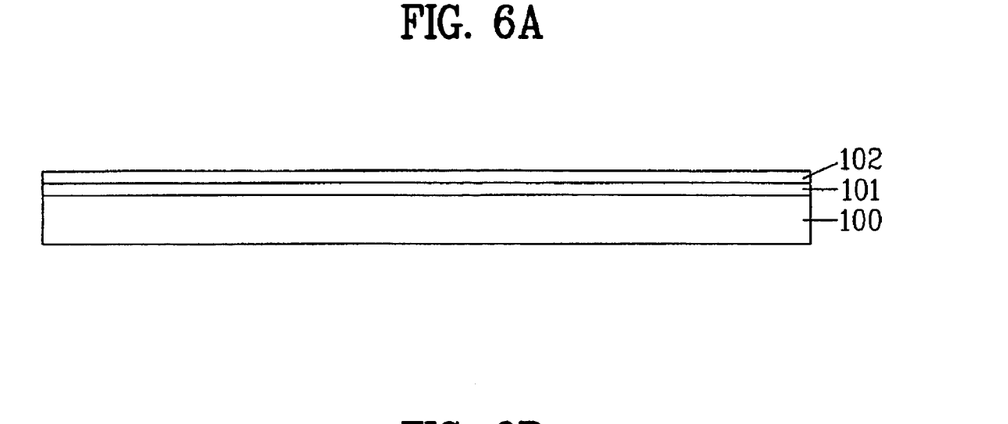
FIG. 6A to FIG. 6J are cross sectional views of the fabrication process for a trans-reflective type LCD device along V-V' of FIG. 4 according to the present invention.

As illustrated in FIG. 6A, the buffer insulating layer 101 and an amorphous silicon layer are deposited on the substrate 100. The amorphous silicon layer is then crystallized in a thermal curing process or a laser annealing process, thereby forming a polysilicon layer 102. Other methods for forming a polysilicon layer are possible and within the scope of the invention.

Figure 6B:
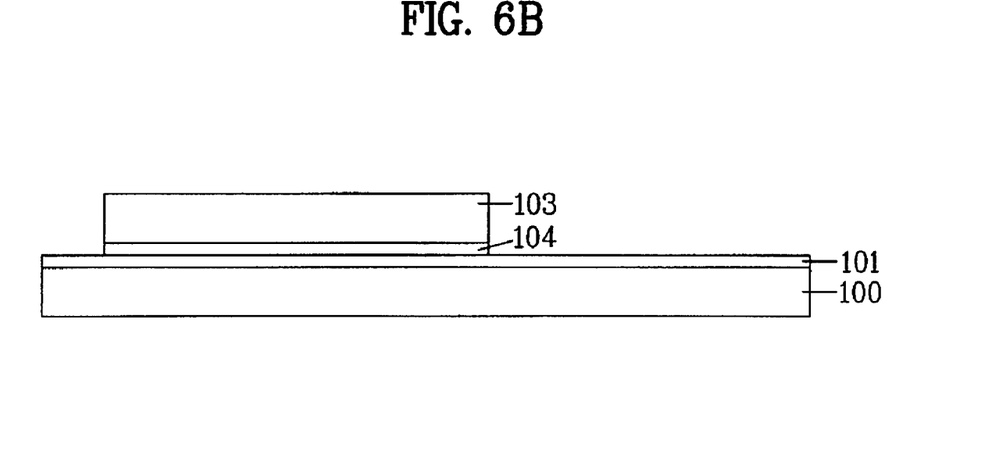

Referring to FIG. 6B, a first photoresist layer 103 is deposited on the polysilicon layer 102, and is then patterned to correspond to the thin film transistor and the storage capacitor by using photolithography and a first mask. The polysilicon layer 102 is then etched using the patterned first photoresist 103 as a mask, thereby forming the semiconductor pattern 104. The remaining photoresist is subsequently removed.

Figure 6C:
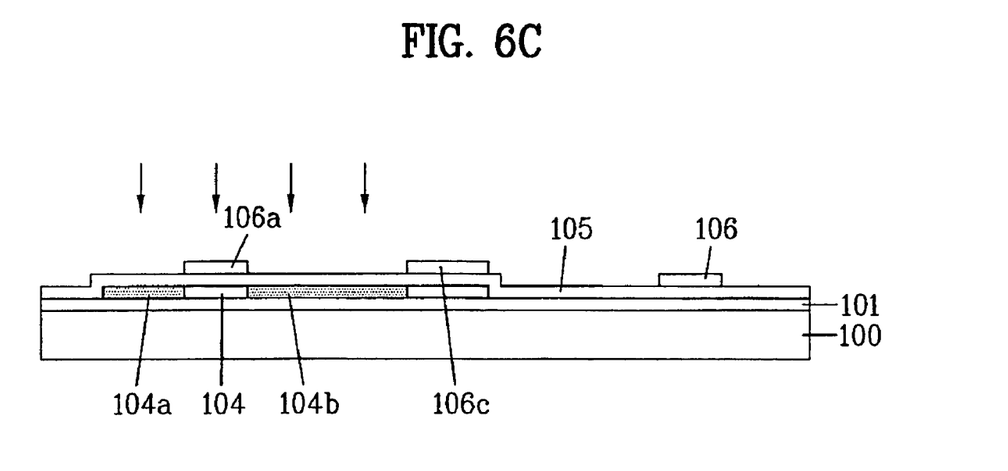

As illustrated in FIG. 6C, the gate insulating layer 105 is deposited on the entire surface of the substrate 100 including the semiconductor pattern 104. Afterward, a conductive metal layer, which may include aluminum Al, molybdenum Mo, or tungsten W, or an alloy layer thereof, is deposited on the gate insulating layer 105. The conductive metal layer may be patterned via photolithography using a second photoresist layer, a second mask and an etching process, thereby forming the gate line 106 in a first direction and the gate electrode 106a projected from the gate line 106 and overlapped with the semiconductor pattern 104. The common line 106b is formed in parallel with the gate line 106 and is overlapped with the semiconductor pattern 104. The portion of the common line 106b overlapped with the semiconductor pattern 104 forms the storage capacitor electrode 106c.

Impurity ions are implanted to the semiconductor pattern 104 using the gate electrode 106a and the storage electrode 106c as a mask, thereby forming the source and drain regions 104a and 104b in the semiconductor pattern 104, wherein the source and drain regions 104a and 104b are located at either side of the gate electrode 106a.

Figure 6D:
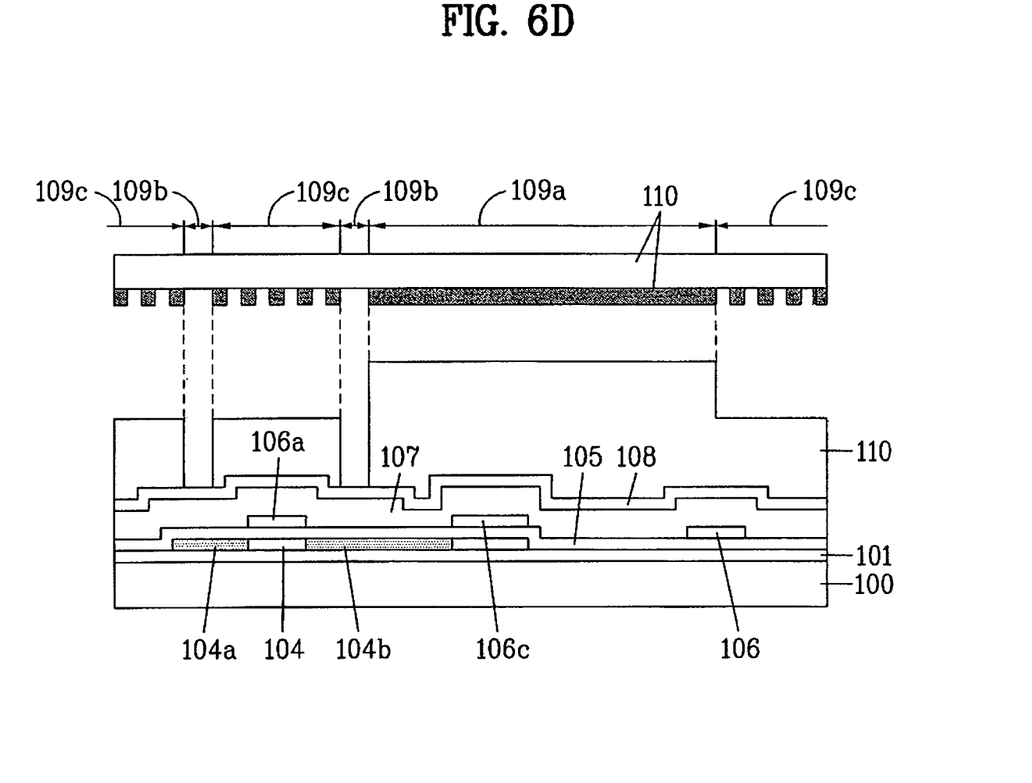

As illustrated in FIG. 6D, an insulating interlayer 107, a transparent conductive layer 108, and a third photoresist 110 are sequentially deposited on the entire surface of the substrate 100 including the gate line 106, the gate electrode 106a, and the storage electrode 106c. The insulating interlayer 107 may be formed of a silicon oxide layer or a silicon nitride layer. The transparent conductive layer 108 may include indium-tin-oxide (ITO), tin-oxide (TO), indium-zinc-oxide (IZO), or indium-tin-zinc-oxide (ITZO).

Then, the third photoresist 110 is patterned to have the different thickness on the transparent conductive layer 108 by an exposure and development process using a third mask 109. The third mask 109 is a half-tone mask, which is divided into a first area 109a, a second area 109b, and a third area 109c.

The first area 109a of the third mask 109 corresponds to an opaque region, and the third photoresist 110 corresponding to the first area 109a remains after the exposure and development process. The second area 109b of the third mask 109 corresponds to a transmitting region for forming the contact holes in the source and drain regions 104a and 104b. The third photoresist 110 corresponding to the second area 109b is completely removed after the exposure and development process. The third area 109c of the third mask 109 corresponds to a partially transmitting region, whereby the third photoresist 110 corresponding to the third area 109c remains at an intermediate thickness after the exposure and development process. In a particular embodiment, the intermediate thickness is about one half of the pre-exposure thickness.

Figure 6E:
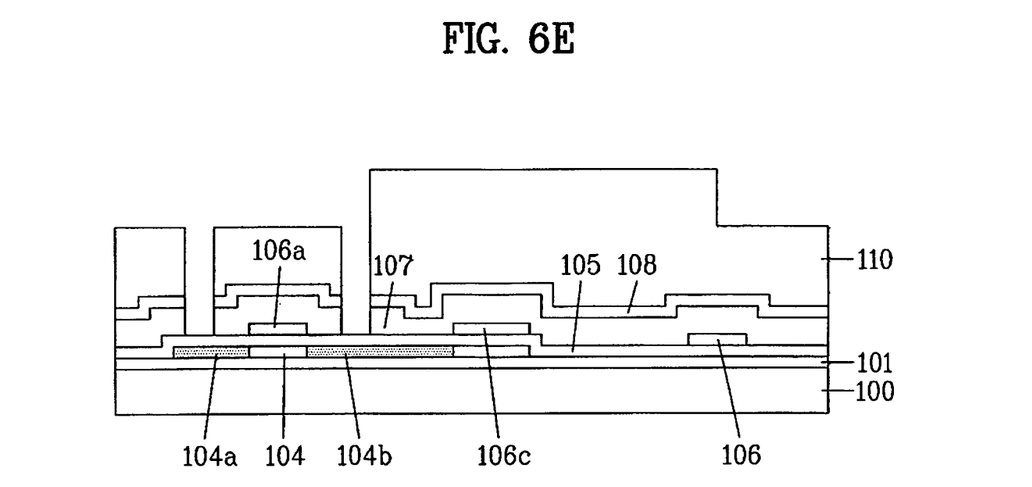

As illustrated in FIG. 6E, the transparent conductive layer 108 and the insulating interlayer 107 corresponding to the second area are selectively removed using the patterned third photoresist 110 as a mask. The transparent conductive layer 108 is removed in a wet-etching process. After that, the insulating interlayer 107 is removed in a dry-etching process. It will be apparent to one of ordinary skill that other etching process may be used, depending on the materials used for the respective layers.

Figure 6F:
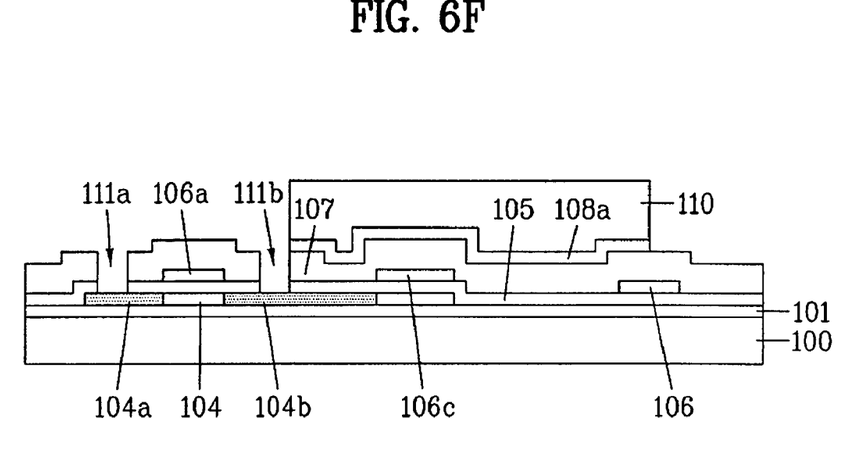

Referring to FIG. 6F, the third photoresist 110 is ashed to expose the transparent conductive layer 108 of the third area 109c, so that the third photoresist 110 remains corresponding to the first area 109a. By the wet-etching process using the third photoresist 110 of the first area 109a as a mask, the transparent conductive layer 108 of the third area 109c is removed, and the gate insulating layer 105 of the second area 109b is removed, thereby forming the transmissive electrode 108a of the first area 109a, and the contact holes 111a and 111b for exposing the source/drain regions 104a/104b. Then, the remainder of the third photoresist pattern 110 is removed. As a result, the storage capacitor is formed by the semiconductor pattern 104, the gate insulating layer 105, and the storage electrode 106c, and/or the storage electrode 106c, the insulating interlayer 107, and the transmitting electrode 108a.

Figure 6G:
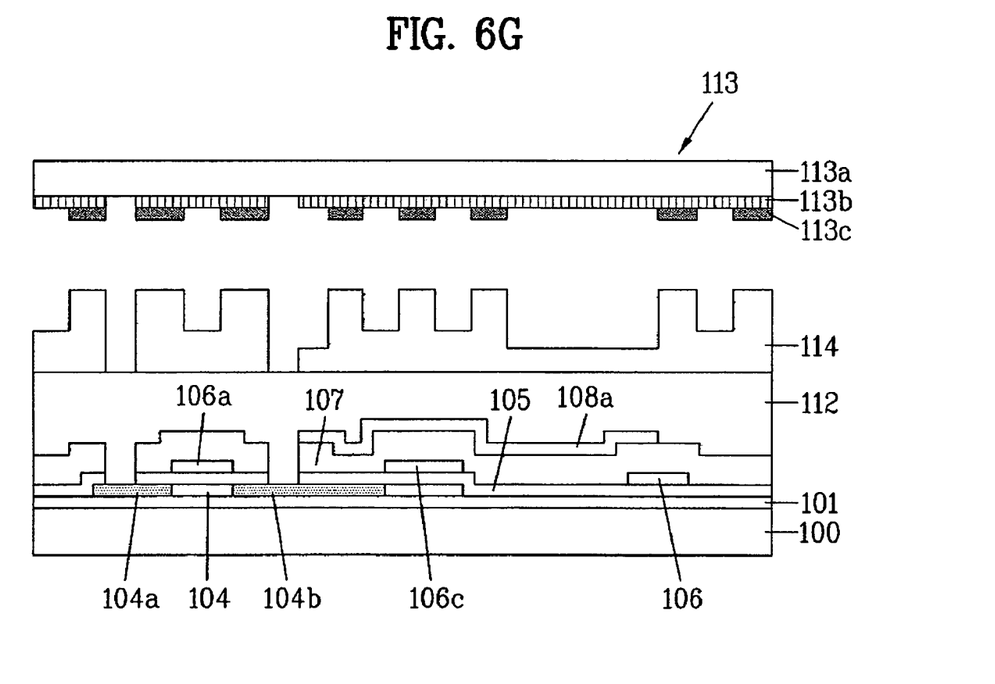

As shown in FIG. 6G, the organic insulating layer 112 and a fourth photoresist 114 are sequentially formed on the entire surface of the substrate 100. The organic insulating layer 112 may include photo acryl. The fourth photoresist 114 is then patterned to have a step-like coverage by the exposure and development process using a fourth mask 113, wherein the step-like coverage has upper portions 114a and lower portions 114b. The upper portions 114a correspond to the upper portions 117a of the uneven surface 117 of the reflective part of the pixel region, and the lower portions 114b correspond to the lower part 117b of the uneven surface 117.

The fourth mask 113 may be formed in a three-layered structure of a transmissive layer 113a, a semi-transmissive layer 113b, and a light-shielding layer 113c, wherein the transmissive layer 113a, the semi-transmissive layer 113b, and the light-shielding layer 113 are formed in sequence. In a particular embodiment of the fourth mask 114, the transmissive layer 113a includes quartz, the semi-transmissive layer 113b includes molybdenum silicide, and the light-shielding layer 113c includes chrome Cr. The semi-transmissive layer 113b transmits the light at a percentage of about 30% to 50% depending on its thickness and opacity, and the light-shielding layer 113c may have the variable width and interval according to the size and shape of the uneven surface of the reflective electrode. It will be readily apparent that other materials may be used for the light shielding layers, depending on relative transmissivities.

The area of the fourth mask 113 exclusively having the transmissive layer 113a corresponds to the contact holes 111a and 111b which respectively correspond to the source region 104a and the drain region 104b.

The areas of the fourth mask 113 having the semi-transmissive layer 113b correspond to the following areas of the LCD device illustrated in FIG. 5: the lower portions 117b of the uneven surface 117 of the reflective part of the pixel region; the transmitting hole 115c, which in turn corresponds to the transmissve part of the pixel region; and the portion of the drain contact hole 115b in which the reflective electrode 116c contacts the transmissive electrode 108a. The fourth mask 113 may be constructed such that the semi-transmissive layer 113a is disposed on the transmission layer 113a at those areas.

Finally, the areas of the fourth mask 113 having the light shielding layer 113c correspond to the upper portions 117a of the uneven surface 117 of the reflective part of the pixel region, as illustrated in FIG. 5. The light-shielding area of the fourth mask 113 may be formed of the transmission layer 113a (as a substrate), the semi-transmission layer 113b on the transmission layer 113a, and the light-shielding layer 113c on the semi-transmission layer 113b.

The fourth photoresist 114 is patterned to have the different thickness by the exposure and development process using the fourth mask 113. That is, the fourth photoresist 114 corresponding to the transmissive layer 113a is completely removed to expose the organic insulating layer 112; the lower portions 114b of the fourth photoresist 114 corresponding to the semi-transmissive layer 113b is removed at a predetermined thickness; and the upper portions 114a of the fourth photoresist corresponding to the light-shielding layer 113c remains.

The portions of the fourth photoresist 114 corresponding to the transmitting hole 115c and the drain contact hole 115b are relatively thinner than those corresponding to the lower portions 117b of the uneven surface 117 of the reflective area of the pixel region. This is generally caused by the latter features being smaller in area, and this the corresponding features of the light-shielding layer 113c are closer together. Since the light-shielding features are closer together, the effective aperture formed by them is smaller compared to the larger features. The smaller aperture, coupled with subsequent diffractive and interference effects, leads to greater attenuation of light impinging on areas of the fourth photo-resist 114 corresponding to the lower portions 117b of the uneven surface 117 than on areas corresponding to the transmitting hole 115c and the drain contact hole 115b.

Figure 6H:
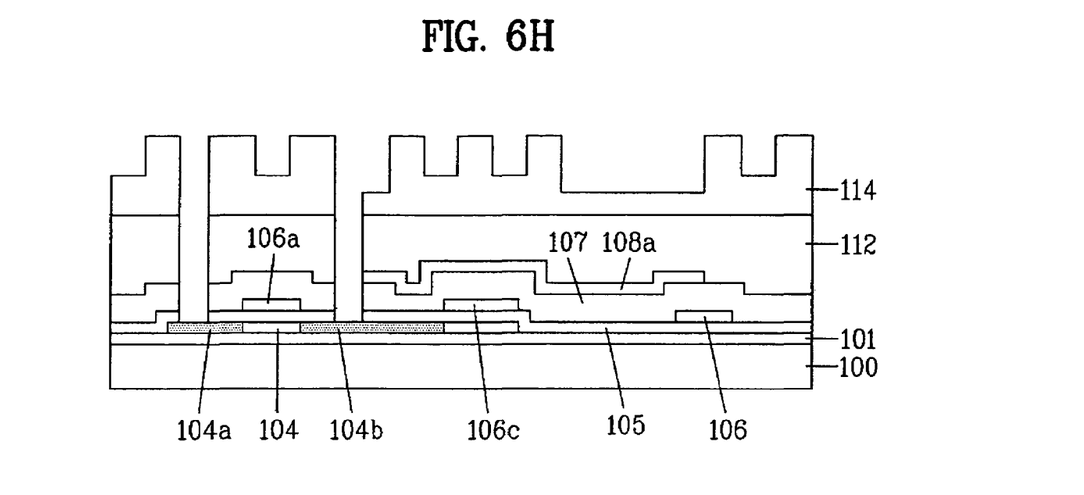

As illustrated in FIG. 6H, the organic insulating layer 112 corresponding to the transmission area of the fourth mask 113 may be removed in the dry-etching process using the patterned fourth photoresist 114 as a mask.

Figure 6I:
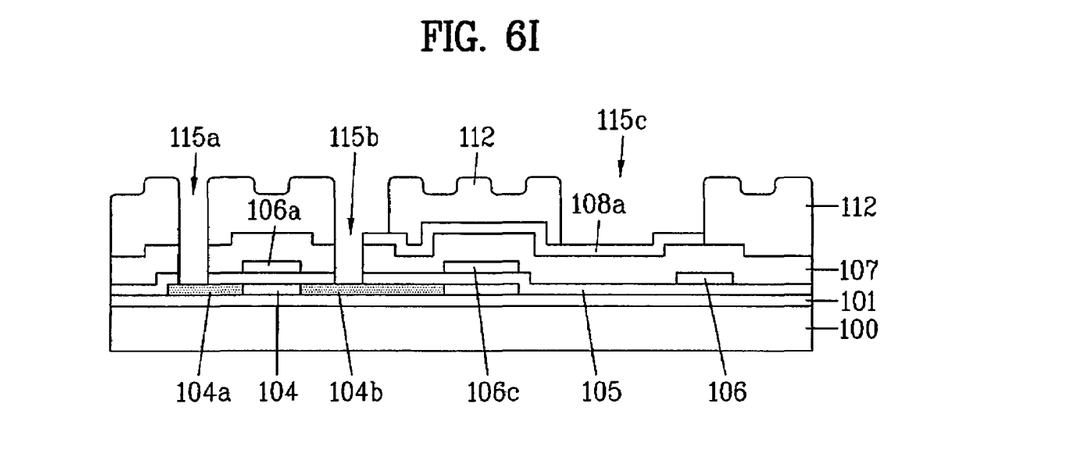

As illustrated in FIG. 6I, the fourth photoresist pattern 114 and the organic insulating layer 112 are etched in the dry-etching process until the transmitting electrode 108a of the transparent conductive layer 108 and the source/drain regions 104a/104b is exposed. In the dry-etching process, the transparent conductive layer 108 may function as an etching-stop layer.

According to this process, the source and drain contact holes 115a and 115b are respectively formed on the source and drain regions 104a and 104b. Also, the organic insulating layer 112 corresponding to the first area of the semi-transmission area is etched at the predetermined thickness, thereby forming the upper portions 117a and lower portions 117b of the uneven surface 117 of the reflective part. The transmitting hole 115c is formed in the second area of the semi-transmission area 113b. As a result, the reflective part is formed of the uneven surface 117, and the transmitting electrode 108a is exposed by the transmitting hole 115c. After that, a reflow process is performed on the uneven surface 117 of the reflective part to providing curved features, or alternating concave and convex features, on the uneven surface 117.

Figure 6J:
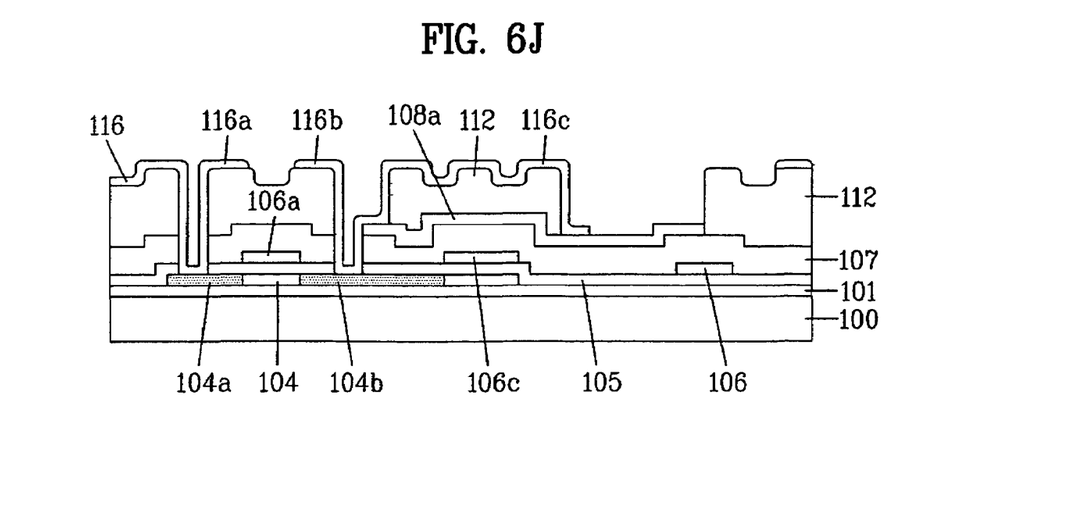

As shown in FIG. 6J, a reflective metal layer having the low resistance value and relatively high transmittance, for example, aluminum Al, aluminum alloy, or argentum Ag, is deposited on the entire surface of the substrate 100 including the source and drain contact holes 115a and 115b, and the transmitting hole 115c.

Next, the reflective metal layer is selectively removed by photolithography using a fifth photoresist and a fifth mask (not shown), thereby forming the data line 116 crossing the gate line 106 to define the pixel region, the source electrode 116a of the reflective metal material in the source region 104a, the drain electrode 116b, and the reflective electrode 116c. The reflective electrode 116c and the drain electrode 116b may be formed in the reflective part, and are respectively connected with the drain region 104b and the transmitting electrode 108a. The source electrode 116a may be projected from one side of the data line 116. Further, since the reflective electrode 116c has the uneven surface, it is possible to improve the efficiency of reflection.

The reflective metal layer may be formed by depositing first metal material having a low resistance value and the second metal material having a high transmittance. For example, the first metal material may include molybdenum Mo, and the second metal material may include aluminum Al, aluminum alloy (for example, AlNd), or argentum Ag.

Using a first metal material such as molybdenum Mo may have certain advantages. For example, it is possible to decrease the contact resistance at the interface of the reflective metal layer and the transmissive electode 108a if Mo is in contact with the transparent electrode (ITO). Furthermore, if the Al/AlNd (used for the second metal material) is in direct contact with the transparent electrode (ITO), galvanic corrosion may result due to $Al_2O_3$ formed in an interface between Al/AlNd and the transparent electrode (ITO). However, if the reflective electrode is formed by depositing a first and second metal materials as described above, it is possible to prevent galvanic corrosion generated by the direct contact between Al/AlNd and the transparent electrode (ITO).

As mentioned above, the trans-reflective type LCD device according to the present invention and the method for fabricating the same have further advantages.

First, it is possible to decrease the required number of masks by using the half-tone mask and the diffraction exposure, thereby obtaining the simplified fabrication process, further, fabricating the competitive goods.

Also, it is generally not required to perform the additional thermal process for forming the uneven surface of the reflective part, whereby it is possible to prevent the characteristics of the organic insulating layer of the photo acryl from being deteriorated.

In addition, the reflective electrode is formed on the transmitting electrode, so that it is possible to prevent the decrease of reflectivity as compared with the related art of forming the reflective electrode below the transmitting electrode.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a trans-reflective type LCD device including unit pixel regions, each pixel region having a reflective part and a transmissive part, comprising:
   forming an insulating interlayer and a transparent conductive layer on a substrate;
   forming a transmissive electrode in the pixel region by selectively removing the insulating interlayer and the transparent conductive layer with a first half-tone mask;
   depositing an insulating layer on the entire surface of the substrate including the transmissive electrode;
   selectively removing the insulating layer so that the remaining insulating interlayer corresponds to the transmissive part and so that the remaining insulating layer has an uneven surface, the selectively removing the insulating layer being done using a second half-tone mask,
   wherein using the second half-tone mask includes using a second half-tone mask having:
   a light-shielding mask area corresponding to a plurality of upper portions of the uneven surface; a semi-transmissive mask area corresponding to a plurality of lower portions of the uneven surface and the transmissive part;

and a transmissive mask area corresponding to a contact hole for the drain region; and forming a reflective electrode in the reflective part to be electrically connected with a drain region and the transmissive electrode.

2. The method of claim 1, wherein the forming a transmissive electrode includes:

removing a portion of a transparent conductive layer using a wet-etching process; and removing a portion the insulating interlayer using dry-etching process.

3. The method of claim 1, wherein the selectively removing the insulating layer includes:

depositing a photoresist on the insulating layer;

exposing and developing the photoresist using the second half-tone mask; and dry-etching the insulating layer until the insulating layer is removed from a contact hole for the drain region and from the transmissive part using the developed photoresist as a mask.

4. The method of claim 1, wherein the forming an insulating interlayer and a transparent conductive layer includes forming the transparent conductive layer having indium-tin-oxide (ITO), tin-oxide (TO), indium-zinc-oxide (IZO), or indium-tin-zinc-oxide (ITZO).

5. The method of claim 1, wherein the selectively removing the insulating layer includes reflowing the uneven surface of the insulating layer so as to form a plurality of convex and concave portions of the uneven surface.

6. The method of claim 1, wherein the depositing an insulating layer includes depositing an organic material.

7. The method of claim 1, wherein the depositing an insulating layer includes depositing photo acryl.

8. The method of claim 1, wherein forming a reflective electrode includes forming a metal layer having aluminum.

9. The method of claim 1, wherein forming a reflective electrode includes:

forming a first metal material having a low resistance; and forming a second metal material of high transmittance.

10. The method of claim 9, wherein the forming the first metal includes forming a layer having molybdenum.

11. The method of claim 9, wherein the forming the second material includes forming a layer having aluminum Al.

12. The method of claim 9, wherein the forming the second material includes forming a layer having aluminum neodymium AlNd.

13. The method of claim 1, wherein the forming an insulating interlayer includes forming an insulating interlayer having silicon oxide.

* * * * *